United States Patent
Chorey

[15] 3,672,549
[45] June 27, 1972

[54] CAR TOP CARRIER AND ACCESS LADDER

[72] Inventor: Andro J. Chorey, 8315 Gibson Road, Canfield, Ohio 44406

[22] Filed: Dec. 15, 1969

[21] Appl. No.: 884,882

[52] U.S. Cl............................224/42.1 E, 182/127, 280/163
[51] Int. Cl. .......................................B60r 3/00, B60r 9/04
[58] Field of Search...............224/42.1 E; 280/163; 182/127, 182/88

[56] References Cited

UNITED STATES PATENTS

| | | | |
|---|---|---|---|
| 2,922,557 | 1/1960 | Jessen | 182/88 |
| 3,112,501 | 12/1963 | McDougal | 224/42.1 |
| 3,083,784 | 4/1963 | Urian | 182/88 |
| 2,819,005 | 1/1958 | Roberts | 224/42.1 E |
| 3,185,518 | 5/1965 | Zentner | 224/42.1 E |

Primary Examiner—Robert G. Sheridan
Assistant Examiner—Lawrence J. Oresky
Attorney—Michael Williams

[57] ABSTRACT

A car top rack and an access ladder assembly is herein disclosed. The rack is removably mounted on the roof of the car by bracket supports which provide for adjustment to conform to the contour of the car roof and to provide for leveling of the carrier. The ladder forms part of the structure and may be stored between rails which extend longitudinally of the car, for transportation purposes. The access ladder may be easily moved from its stored position to a position wherein it extends downwardly from the rear portion of the car top rack, with its lowerend engaging the ground, whereby ready access to the carrier, and the material supported thereby, is effected.

4 Claims, 9 Drawing Figures

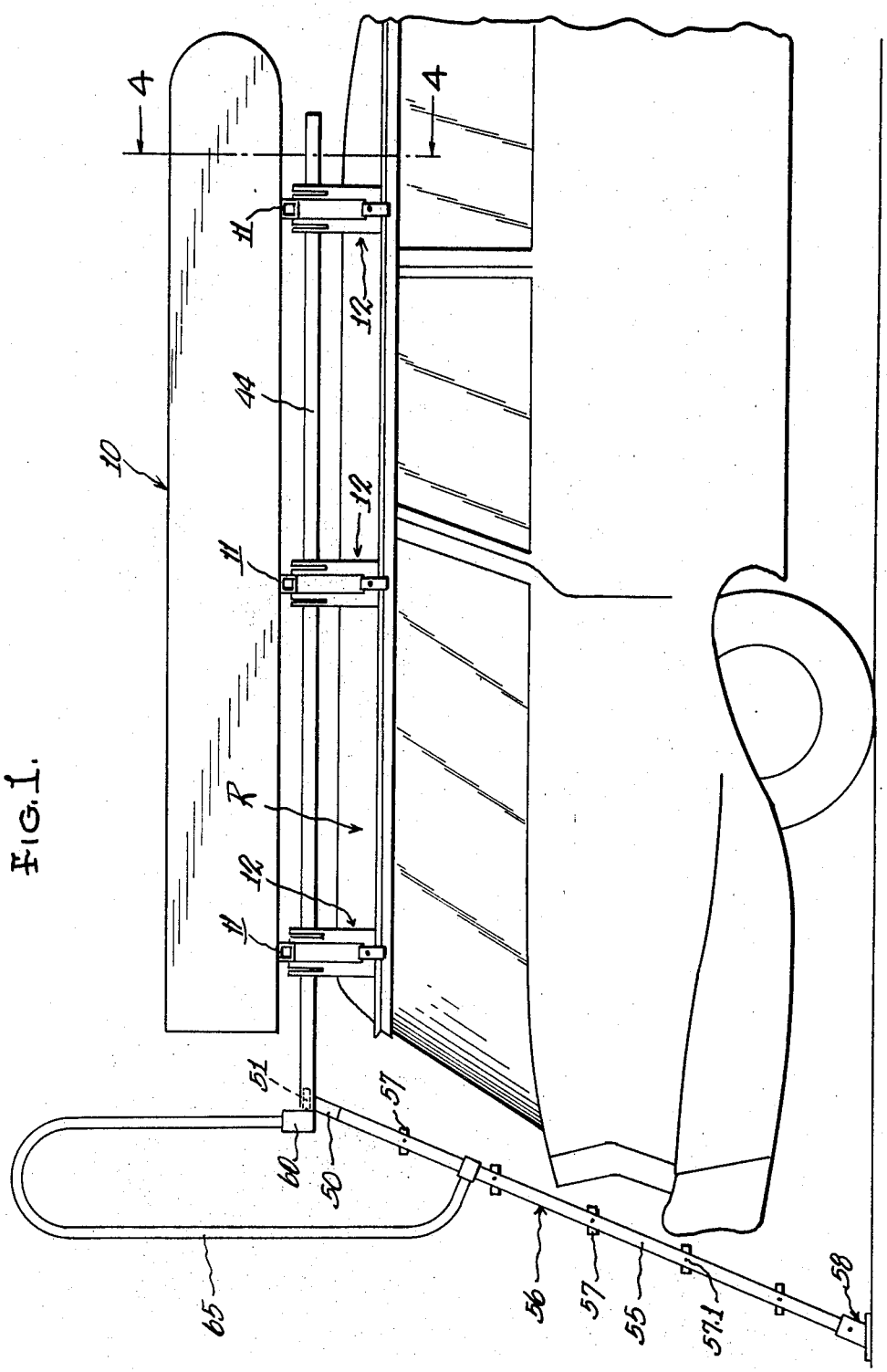

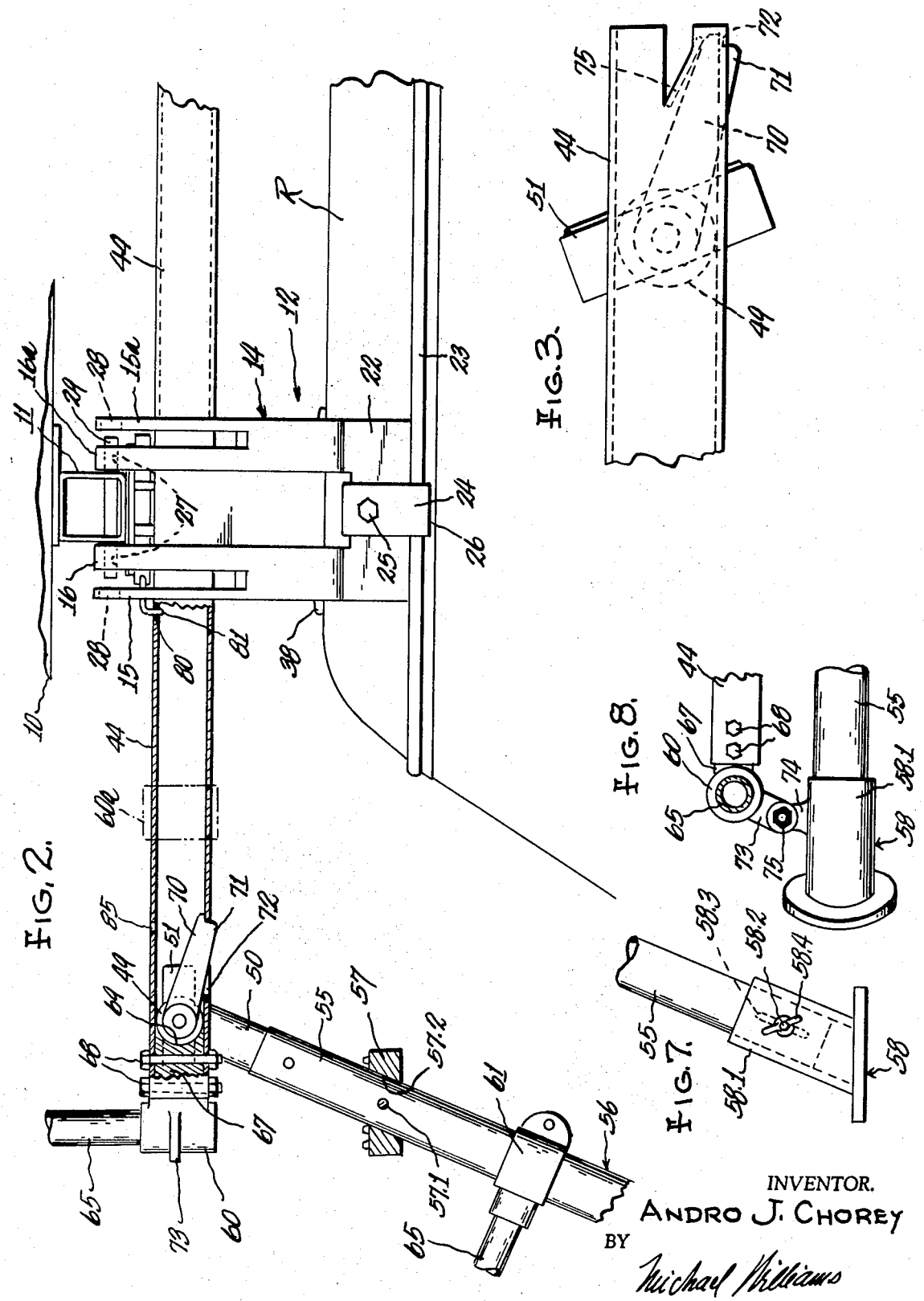

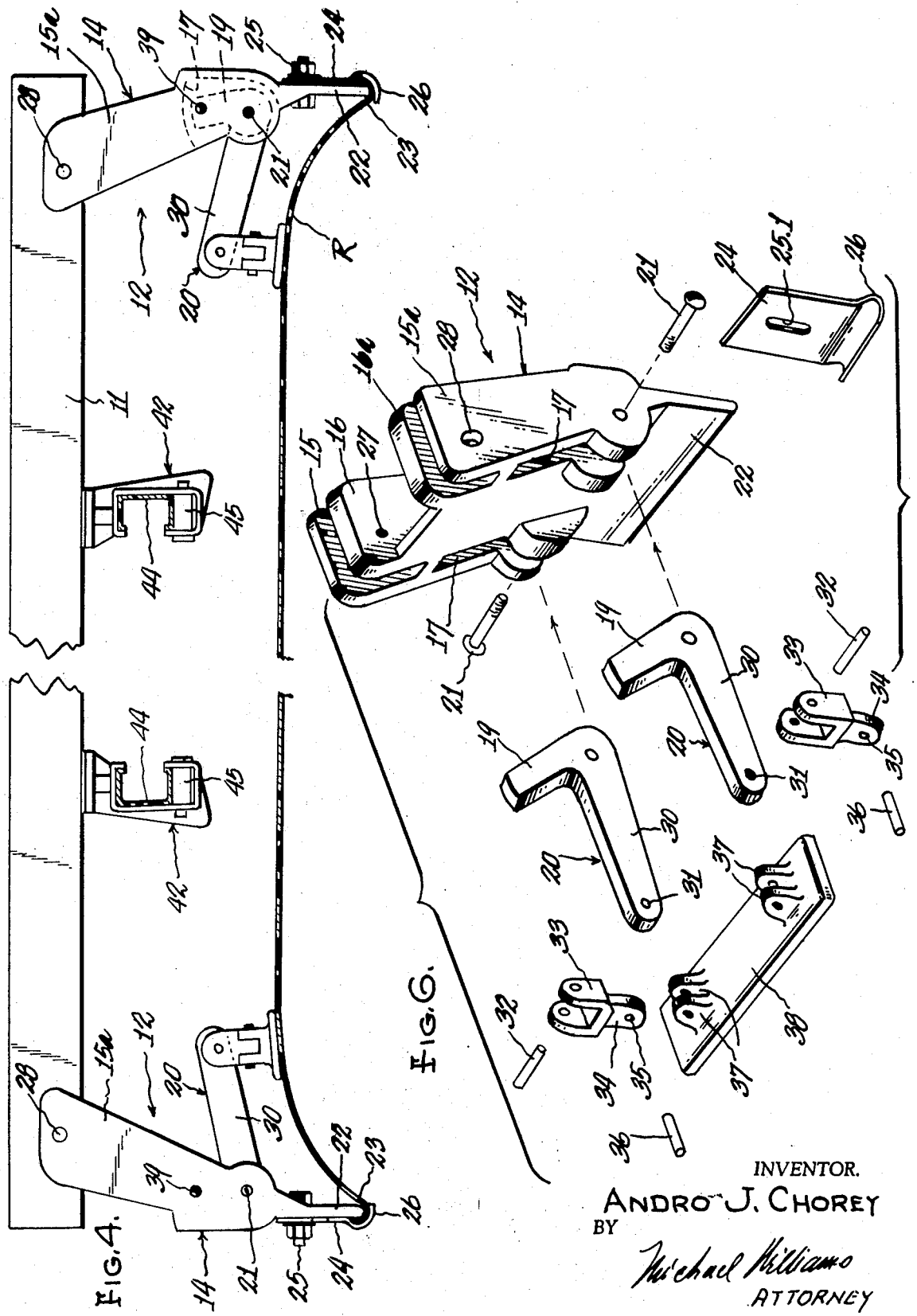

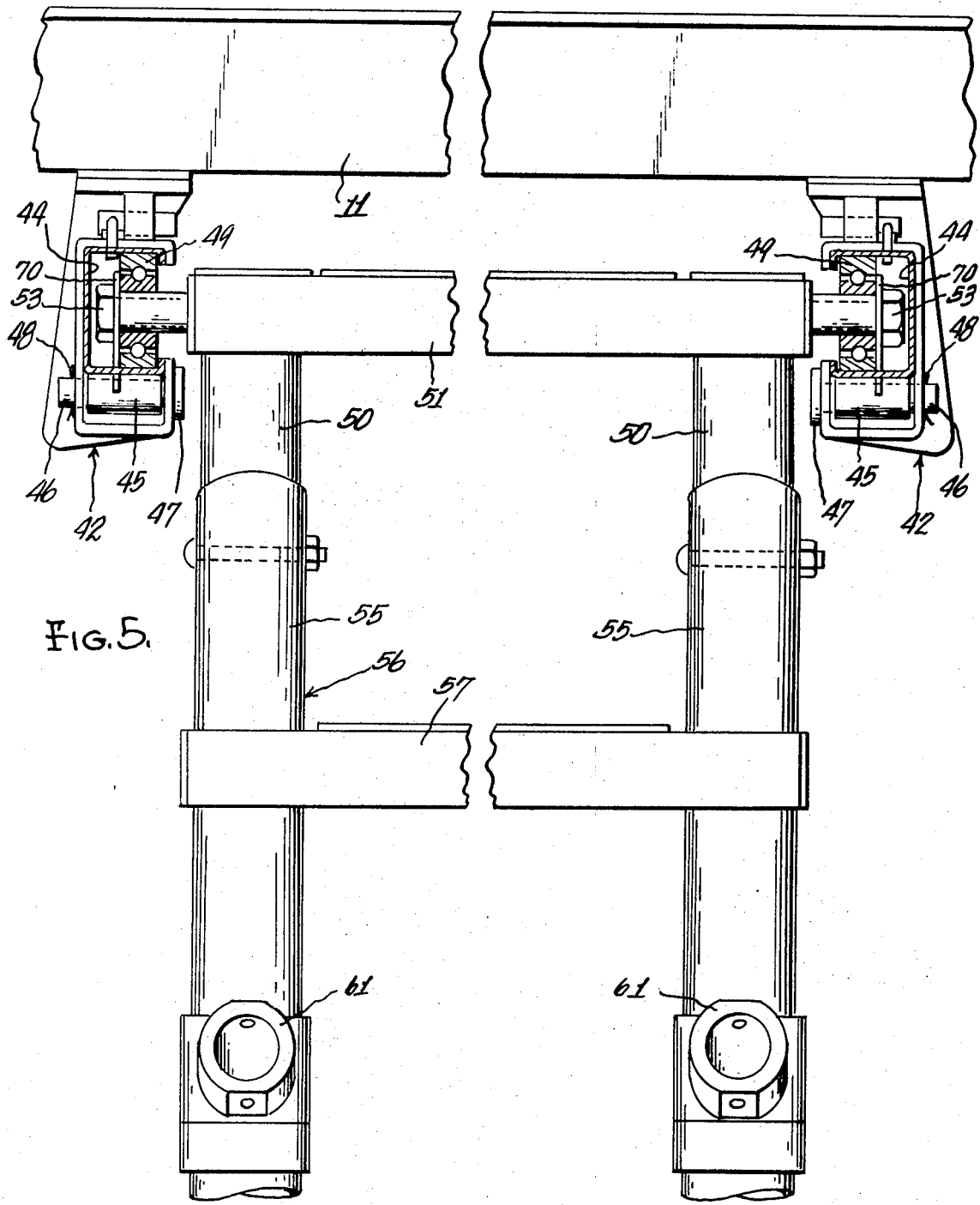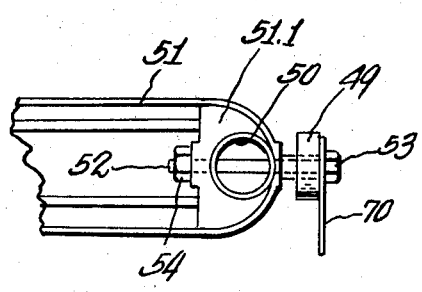

CAR TOP CARRIER AND ACCESS LADDER

BACKGROUND AND SUMMARY

With camping by automobile on the increase, a distinct need has been manifested for a car top rack and a ladder assembly wherein a person may readily reach the rack. In certain cases, the car top rack is adapted to support a tent and a sturdy and readily available ladder is essential to provide access to the tent. Heretofore, as far as I am aware, ladders which are separate from the carrier, were used to gain access to the car top carrier, or the tent carried thereby, and difficulty has been experienced in firmly connecting such a separate ladder to the carrier, and in properly transporting the ladder. In those cases of which I am aware, where a ladder-like structure has been made a part of the car top carrier assembly, the ladder was stored cross-wise of the car, making either a short ladder necessary, or requiring that the ladder be formed in telescoping sections which may cause difficulty from a standpoint of sturdiness or from a standpoint of ease of operation.

In those cases of which I am aware, where a ladder-like support was stored longitudinally of the car, either a short ladder was provided, or the ladder had unsupported portions overhanging the car roof, making for an unstable structure.

My invention provides a car top carrier which may be easily connected to, or removed from, the car roof, and includes bracket structures which provide for adjustment to conform to the contour of the car roof and which distribute the load of the carrier, and its contents, evenly over the car roof to prevent damage to the latter.

My invention also provides an access ladder structure which may depend from the carrier at the rear of the car, or which may be stored between longitudinally extending rails of the car top carrier. The rails are adjustable longitudinally of the car so that the ladder may easily clear the rear of the car in operable position, and in stored position the ladder does not materially overhang the rear of the car.

It is therefore a primary object of my invention to provide a new and improved car top carrier and access ladder assembly.

DESCRIPTION OF THE DRAWINGS

In the drawings accompanying this description and forming a part of this specification, there is shown, for purpose of illustration, an embodiment which my invention may assume, and in these drawings:

FIG. 1 is a general view looking from the side of a car, showing my improved car top carrier with a ladder in position to provide access to the carrier and its contents, FIG. 2 is an enlarged, fragmentary side elevational view of the carrier and ladder, parts being shown in section to illustrate detail, FIG. 3 is an enlarged fragmentary side elevational view of the forward end of the rails of the car top carrier, FIG. 4 is a transverse sectional view generally corresponding to the line 4—4 of FIG. 1, FIG. 5 is an enlarged fragmentary view of the top portion of the access ladder, with parts in section to show the connection between the ladder and the car top carrier, FIG. 6 is a separated perspective view of the assembly brackets for the car top carrier, FIG. 7 is a fragmentary view of the foot structure for the ladder, FIG. 8 is a fragmentary view showing the construction for locking the foot-structure to the rear of the rails of the car top carrier, and FIG. 9 is a fragmentary view of a step structure.

DESCRIPTION OF THE PREFERRED EMBODIMENT

The preferred embodiment of my invention comprises a carrier for a car top, and a ladder assembly for providing access to the carrier and the structure supported by the carrier. As shown in FIG. 1 the carrier is shown in the form of an elongated box 10 which may be of any suitable form. The box may contain camping gear, such as a tent or the like.

Secured to the bottom of the box, and extending cross-wise thereof, are a plurality of metal tubular members 11, here shown to be square in cross-section and three in number. Each member 11 is supported from the roof R of the automobile by bracket assemblies 12 secured to opposite ends of the member, as best seen in FIG. 4. The bracket assemblies not only connect the members 11 to the roof R in spaced relation upwardly from the latter, but also distribute the load of the box 10 and its contents so that the load is not concentrated on any particular part of the roof.

Each assembly 12 comprises a bracket 14 best seen in FIG. 6, which is formed with pairs of spaced blades 15, 16 and 15a, 16a, defining pockets 17, 17, respectively, therebetween. Each pocket receives a leg 19 of a bell crank lever 20, and each lever is pivotally mounted on the bracket, by means of pivot screws 21, so that the leg may swing within its pocket 17, the latter being arcuately shaped, as seen in FIG. 4 to permit swinging of the lever leg 19.

The bottom of each bracket 14 is formed with an elongated foot 22 which fits within and rests against the rain gutter 23 of the car roof R. A plate 24 is bolted to each foot 22, as at 25, and has a curved lower finger 26 which fits under the rain gutter 23 to hold each bracket firmly to the roof R. The opening in the plate 24, through which the bolt 25 passes may be vertically elongated, as shown at 25.1 in FIG. 6, for adjustment purposes.

A pin 29 (FIG. 2) passes through aligned openings 27 in the blades 16, 16a and through a corresponding opening in the tubular member 11 to hold the latter assembled with each bracket 14. The blades 15, 15a are provided with enlarged openings 28 (FIG. 2) to freely pass the pin 29 and thus permit assembly of the pin from a side of either blade 16, 16a. Suitable cotter pins (not shown) may be provided to hold the pin 29 in place.

The bell crank levers 20 have legs 30 which extend from respective brackets inwardly of the car roof R, as best seen in FIG. 4, the extremity of each leg being formed with an opening 31 to pass a pin 32 which also passes through a clevis 33 to pivotally connect the latter to the leg 30. A finger 34 extends downwardly from each clevis 33 and has an opening 35 to pass a pin 36 which also passes through spaced ears 37 extending upwardly from a plate 38. The plate rests against the car roof R and has cushion material (not shown) on its undersurface to prevent marring of the roof finish.

The foregoing assembly provides adjustment to compensate for differences in configuration of various car roofs and thus permits the plates 38 to rest flatwise on the roof to avoid indentations in the latter which may be caused by the load of the carrier.

After the brackets 14 are secured to the rain gutter of the car roof, and the bell crank levers pivotally adjusted relative to the brackets so that the tubular members 11 are level, holes are drilled through blades 15, 16 and 15a, 16a, and the leg 19 within the pockets 17. The holes in the blades 15, 15a may be larger than the holes in the blades 16, 16a, and the latter holes may be threaded. A screw 39 is passed through the aligned holes in the blades 15, 15a and the legs 19, and threaded into the holes in the blades 16, 16a.

Alternately, each leg 19 may be formed with a threaded hole and each blade 15, 15a formed with an arcuate slot concentric with the axis of pivot screws 21, the screws 39 passing through the slots and threaded into the hole in the respective leg, with the head of screw 39 frictionally bearing against the outer surface of blades 15, 15a to maintain the adjustment.

As best seen in FIG. 4, each tubular member 11 has a pair of C-shaped brackets 42 securely attached thereto and extending downwardly therefrom, the brackets being spaced apart a predetermined distance. The brackets 42 provide a support for a pair of C-shaped rails 44-44 which extend longitudinally of the car roof R as seen in FIGS. 1 and 2, and each rail is of less depth than its bracket and has its lower end supported on rollers 45 carried by the brackets 42 for adjustment purposes. The rollers 45 are journalled on pins 46 (FIG. 5) which pass through spaced parts of the bracket, each pin having a head 47 bearing against one bracket part, a cotter pin 48 at the pin end to hold it against displacement.

The rails 44, 44 form tracks within which a pair of ball bearing rollers 49 are adapted to roll. As seen in FIG. 5, the rollers are carried at the upper ends of tube sections 50 and a top step 51 extends between such tube sections. As seen in FIG. 9, each end of the top step 51 has a solid portion 51.1 formed with an opening which closely receives the respective tube section 50 and a bolt 52 passes through the step end, the tube section, and forms a pin to support the respective roller 49. The bolt has a head 53 bearing against the roller to hold it in place, and has a threaded shank on which a nut 54 is threaded.

The tube sections 50 telescopically fit within, and are bolted to, the upper ends of elongated tubes 55 which provide side rails for a ladder structure 56. The lower ends of the rails 55 are adapted to rest on the ground, as seen in FIG. 1, and at spaced intervals additional steps 57 are secured between the rails to enable a person to climb the ladder to reach the box 10, or to enter a tent erected on the box. The steps 57 are similar to the top step 51 except that they do not carry rollers 49. The steps 57 have pins 57.1 which connect them between the rails 55, 55, and the solid portion 51.1 of the top step, and the solid portion of the steps 57, have openings 57.2 (see FIG. 2), which closely receive the rails 55 and hold the step against swinging movement. A foot 58 has a socket 58.1 which telescopically receives the lower end of a respective side rail 55, the feet being adapted to rest on the ground surface, as seen in FIG. 1. A screw 58.2 passes through diametrically opposed holes in the socket and through elongated holes 58.3 in the lower end of the respective rail 55, and a wing nut 58.4 is threaded on the screw to clamp the socket and rail end in adjusted position.

Sockets 60 are securely connected to the rear ends of the tracks 44, and sockets 61 are securely connected to the rails 55, each pair of respective sockets removably receiving opposite ends of a hand rail 65. The sockets 60 (FIG. 2) have blocks 67 formed integral therewith, the blocks fitting within the opening of the C-shaped tracks 44 and secured between opposite flanges thereof by bolts 68. The forward end of each block has a semi-circular opening 69 against which a respective roller 49 bears to limit its rearward movement.

A locking dog 70 (see FIGS. 2 and 5) is pivotally mounted on bolt 52, each dog having a latch 71 which fits in a slot 72 in the lower web of the respective track 44 to cooperate with the surface of the semi-circular opening 69 of the block 67 to maintain the ladder structure in its locked relation shown in FIGS. 1 and 2.

The ladder structure is adapted to be stored over the car roof R and between the tracks 44. To enable this to be done (assuming the hand rails 65 have first been removed), the latches 71 are lifted upwardly and out of the track slots 72, and the lower end of the ladder structure is lifted and swung in clockwise direction as viewed in FIGS. 1 and 2, and then pushed so that the rollers 49 roll along the tracks in a direction toward the forward end of the tracks 44. Forward movement of the rollers is arrested by abutment of the locking dogs 70 with inwardly bent parts 75 which are struck out of the side webs of the tracks 44, as shown in FIG. 3. In this position, the latches 71 fall into slots 72 in the lower web of each track 44.

Each of the sockets 60 has an inwardly directed ear 73, as seen in FIG. 8, and the sockets 58.1 of the feet 58 have ears 74 which align with the ears 73 when the ladder structure is in its stored position, a bolt 75 or other fastening member passing through aligned openings in respective ears 73,74 to hold the end of the ladder locked in position.

To lower the ladder structure, it is merely necessary to remove the bolts 75 and pull the ladder structure rearwardly. This causes the latches 71 to cam upwardly and out of the slots 72 so that the rollers 49 may roll rearwardly along the tracks 44, 44 to the rearwardly locked position shown in FIG. 2. At this time, the feet 58 may be firmly planted on the ground.

As best seen in FIG. 2, the top flange of each track 44 has an opening 80 into which fits a finger 81, the latter being pivotally carried by a part of the respective C-shaped brackets 42. The fingers 81 cooperate with the openings 80 to hold the tracks 44 against longitudinal movement, and with the rear portions thereof sufficiently rearward of the automobile so that the ladder structure freely clears the rear of the automobile.

When the ladder structure is in stored relation, it is desirable that the rear end of the tracks do not overhang the automobile to any great extent, and therefore it is desirable to move the tracks 44 along their supporting rollers 45 in a direction forwardly of the automobile. To accomplish this purpose, the fingers 81 are swung upwardly out of the openings 80, the tracks moved forward, and the fingers 81 permitted to drop into openings 85 in the top webs of the tracks to again lock the tracks against movement. The dot-dash representation 60a in FIG. 2 shows the position of the socket 60 when the tracks 44 have been moved forwardly.

I claim:

1. A car top carrier and access ladder assembly, comprising a plurality of rails adapted to be supported above the roof of a car cross-wise of the same and spaced from each other in a direction longitudinally of the car, means for securing each of the rails to the car top, comprising a pair of bracket members for each rail, each bracket member being connected to a respective end portion of a rail and comprising a bracket body having a portion adapted to fit downwardly into the rain gutter of the car roof and a clamp secured to said bracket body and adapted to engage under the rain gutter, a pair of tracks connected cross-wise of said rails in spaced relation and adapted to extend longitudinally of and horizontally above the car roof, the connection between said rails and said tracks comprising rollers along which said tracks may be adjusted in a direction longitudinally of said car roof, and a ladder having portions at one end fitting within respective tracks and movable therealong to two positions, in one position said portions being disposed at one end of said tracks and permitting swinging of said ladder to depend upright from said tracks so that the other end of said ladder engages a ground surface, and in the other position said portions being disposed at the other end of said tracks and permitting swinging of said ladder whereby with said ladder other end may be elevated above the car roof and held in adjoining relation with said tracks.

2. The construction according to claim 1 wherein stop means limit adjustment of said tracks between two positions.

3. A car top carrier and access ladder assembly, comprising a pair of tracks adapted to be supported horizontally above the roof of a car to extend longitudinally of the car in spaced-apart relation, and a ladder including a pair of spaced side rails and steps therebetween, a step at one end of said ladder having outwardly extending spindles and a roller journalled on each spindle and fitting within a respective track and movable therealong to two positions, a locking dog journalled on each spindle and releasably fitting within slots formed in defining walls of said tracks to hold said ladder in either of its two positions, in one position said rollers being disposed at one end of said tracks and permitting swinging of said ladder so that it may depend upright from said tracks and so that the other end of said ladder may engage a ground surface, and in another position said rollers being disposed at the other end of said tracks and permitting swinging of said ladder so that the ladder other end may be elevated above the car roof and held in adjoining relation with said tracks.

4. A car top carrier and access ladder assembly, comprising a pair of elongated rectilinear tracks, each U-shaped in cross-section, means for securing said tracks to the roof of a car whereby they are supported horizontally above the car roof on opposite sides of the longitudinal centerline of the car and with the openings therein facing each other, a ladder comprising a pair of spaced side rails, a ladder step between said side rails at one end of said ladder, opposite ends of said ladder step having outwardly extending spindles, a roller journalled on each spindle, said rollers fitting within respective tracks so that said one ladder end is movable along said tracks from front to rear and vice versa, said rollers also providing a pivot about which the ladder may be swung vertically, said tracks being so supported that the rear ends overhang the rear of the car roof so that when said ladder one end is at the rear of said tracks the ladder may be positioned so that its opposite end rests on the ground with the ladder at a slight angle to the vertical but spaced from the rear of the car, the disposition of the tracks on opposite sides of the car longitudinal centerline providing stability so that a user may safely climb up the ladder to its very top, said ladder also having a stored position and being movable from its position of use by the user lifting said ladder opposite end to swing the ladder about the pivot provided by said rollers toward a horizontal position and simultaneously pushing the ladder to cause its said one end to move to the front of said tracks, and means for engaging said ladder opposite end and holding said ladder in horizontal stored position.

* * * * *